Sept. 19, 1933.    G. L. McKEE    1,927,688
METHOD AND MEANS FOR MAKING HOSE CONNECTIONS
Filed Dec. 8, 1930
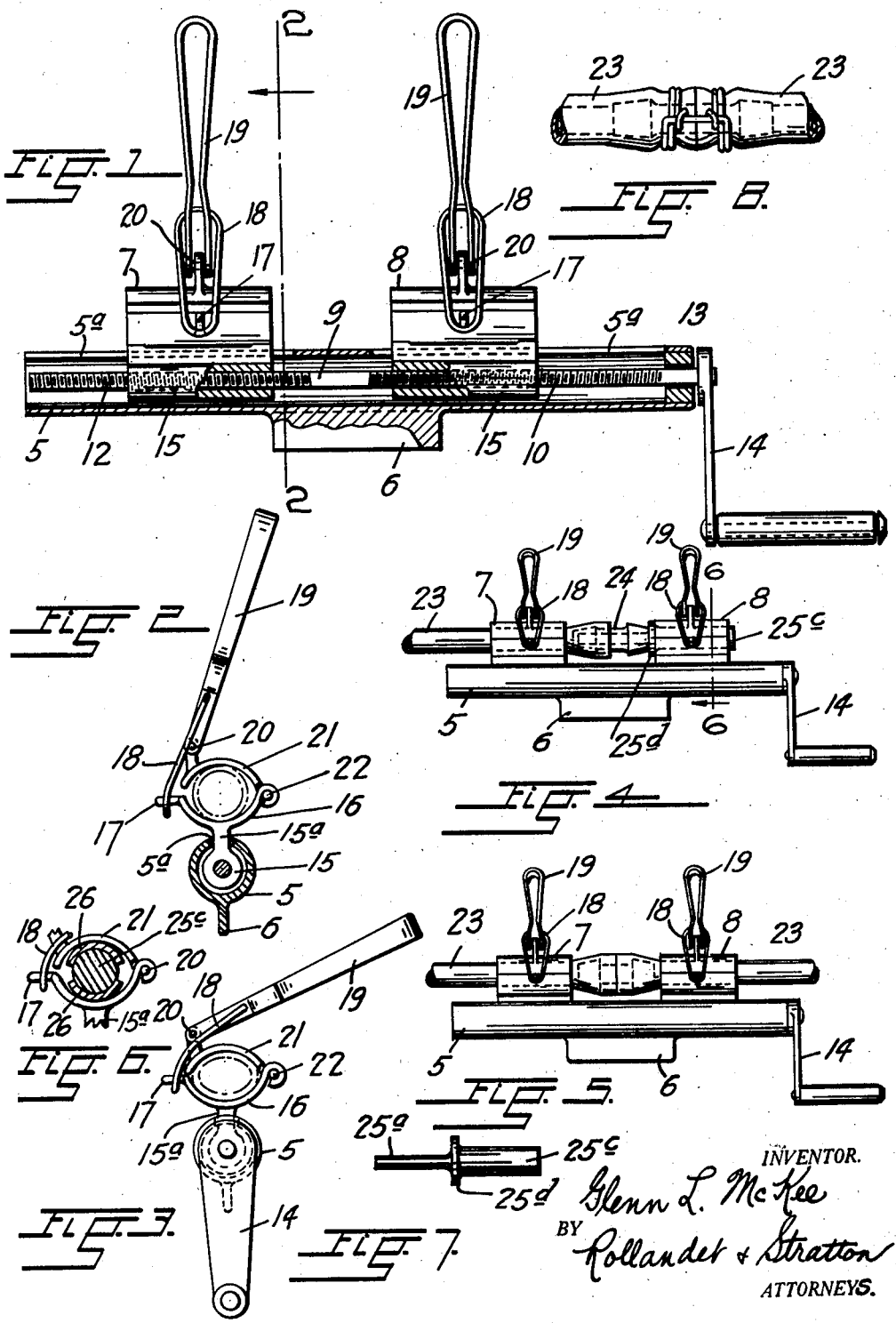
INVENTOR.
Glenn L. McKee
BY Rollander & Stratton
ATTORNEYS.

Patented Sept. 19, 1933

1,927,688

UNITED STATES PATENT OFFICE 1,927,688

METHOD AND MEANS FOR MAKING HOSE CONNECTIONS

Glenn L. McKee, Denver, Colo., assignor, by direct and mesne assignments, to Hose Stayput Tool Company, Denver, Colo., a corporation of Colorado Application December 8, 1930. Serial No. 500,962

6 Claims. (Cl. 29—88.2)

This invention relates to a method and means for making hose connections in which two hose-sections are assembled in end-to-end relation upon a core or ferrule.

The principal object of the invention is to provide a simple method of assembling the hose-sections upon the core by the use of an equally simple implement and other objects reside in details of construction as will clearly appear in the following description.

In the accompanying drawing, in which corresponding parts are similarly designated throughout the views, Figure 1 represents a sectional elevation of the implement, Figures 2 and 3, sections taken on the line 2—2, Figure 1, showing one of the vise-members of the implement, in open and closed conditions, Figure 4, an elevation drawn to a smaller scale, showing the implement in the first step of the process of assembling the hose-sections, Figure 5, a similar elevation showing the implement in the second and final step of the process, Figure 6, a section along the line 6—6, Figure 4, Figure 7, a detail of a support used in the operation of the implement, and Figure 8, an elevation of the completed joint of the hose sections.

The implement, as shown, comprises a hollow, preferably tubular base 5 having a foot 6 or other means for fastening it in a vise or upon any other suitable holding-means. The base provides a guide-bed for two vise-elements 7 and 8, and it forms a housing and support for an endless screw 9 having right hand and left hand screw-threads as at 10 and 12 for the movement of the elements.

The screw is supported for rotation in a bearing 13 at an end of the base, and a hand-crank 14 is fastened at an end of the screw, projecting outside the base at the end thereof at which the bearing is disposed.

The vise elements are alike in construction and each consists of a nut 15 cooperating with one of the screw-threads of the screw. The nut is formed integral with one of two pivotally connected jaw-members, by means of a shank 15a which extends through a longitudinal slot 5a of the base. This jaw-member, designated by the reference numeral 16, is, with relation to its correlative, stationary in the operation of the vise, and it has a lip 17 for the engagement of a toggle link 18.

The link 18 is pivotally suspended from a lever 19 fulcrumed as at 20, on the other or movable jaw-member of the vise, designated by the reference numeral 21. The two jaw-members are pivoted at 22 for the movement of the member 21 relative to the fixed member 16.

In the operation of the invention, the implement is fastened in place, preferably by means of the foot 6 of its base, in a vise or by any other suitable and convenient means. One of the hose sections, 23, to be assembled, is placed in one of the vise members and clamped in place by movement of the lever after the toggle link is placed in engagement with the lip 17. The positions of the parts of the vise, before and after the hose-section has been secured therein, have been illustrated in Figures 2 and 3. The hose-section is placed in the vise-element, so that its end portion projects beyond the same in the space between the elements.

In the next step of the operation, as illustrated in the drawing, a core or ferrule 24 upon which the hose-sections are assembled is driven into the projecting end-portion of the hose-section fastened in the vise 7. In order to do this use is made of a support 25 shown in detail in Figure 7. This support consists of a pin 25a formed in alinement with a shank 25c that is fastened in the vise-element 8. A flange 25d formed integrally at the juncture of the pin and the shank, serves as an abutment for the core placed upon the pin, as shown in Figure 4. With the parts assembled, as shown, the pin of the support is axially alined with the hose-section in the vise-element 7 and the flange 25d of the support bears against the other vise-element 8 in which the shank 25c of the support is clamped.

It will be understood that in case the shank is too small in diameter to be clamped in the vise, filler-pieces may be used as indicated at 26 in Figure 6.

The core or ferrule 24 consists as usual, of a spool-shaped body having two oppositely tapering conical heads at the ends of a tube.

After the core has been placed on the pin 25a, the two vise-elements are moved toward each other by rotation of the screw. This movement forces the head of the core, outermost with relation to the vise-element 8 into the projecting end-portion of the hose-section in the element 7, as shown in Figure 4, and the movement of the vise-elements is continued until substantially one-half of the core is inside the hose-section.

The support 25, and in case they are used, the fillers 26, are now removed from the vise-element 8 after the two elements have again been separated by rotation of the screw.

The other hose-section 23 is then placed in the vise-element 8 and clamped in place with an end-portion thereof projecting into the space between the elements, similarly to the section clamped in the vise-element 7.

As a final step in the process, the two vise-elements are again moved together by rotation of the screw with the result that the end of the core projecting outside the hose-section in the vise 7, is forced to enter the other hose-section, as shown in Figure 5.

The movement of the two vise-elements is continued until the ends of the hose-sections meet. The connected sections are then removed from the implement and the joint is completed by the application of wire clamps of the type disclosed in my application for patent Serial No. 72,661, filed December 2, 1925, preferably by means of the tool shown and described in another co-pending application Serial No. 499,332, filed December 1, 1930.

The completed joint has been shown in Figure 8.

What I claim and desire to secure by Letters Patent is:

1. An implement for assembling hose-sections upon a core, comprising two vise-elements mounted to move one relative to another, and each adapted to secure a hose-section, mechanism to effect said movement, and a core-support having a pin insertable in the core, a shank adapted to be held by one of the elements, and an abutment between the pin and the shank.

2. An implement for assembling a hose-section and a core, comprising two vise-elements mounted to move one relative to another, means to effect said movement, and a core-support, one of the elements being adapted to clampingly secure an end-portion of a hose-section and the other element being adapted to clampingly secure the core-support, the latter having a member projecting beyond the respective vise-element, to hold a core in alinement with the end of a hose-section in the other element.

3. An implement for assembling a hose-section and a core, comprising two vise-elements mounted to move one relative to another, means to effect said movement, and a core support, one of the elements being adapted to clampingly secure an end-portion of a hose-section and the other element being adapted to clampingly secure either a hose-section or the core-support, the latter having a member projecting beyond the respective vise-element, to hold a core in alinement with the end of a hose-section in the other element.

4. An implement for assembling a hose-section and a core, comprising two vise-elements mounted to move one relative to another, means to effect said movement, a core-support and a filler-element fitting upon the same, one of the vise elements being adapted to clampingly secure an end-portion of a hose-section and the other element being adapted to clampingly secure either a hose section, or the core-support by medium of the filler element, the core-support having a member projecting beyond the respective vise-element, to hold a core in alinement with the end of a hose-section in the other element.

5. An implement for assembling a hose-section and a core, comprising two vise-elements mounted to move one relative to another, and normally in spaced relation to each other and a core support, one of the elements being adapted to clampingly secure a hose with the end-portion thereof projecting into said space to receive a core, and the other element being adapted to clampingly secure the core-support, the latter having a member also projecting into the space to hold a core in alinement with the projecting end-portion of the hose-section in the other element.

6. An implement for assembling a hose-section and a core, comprising two vise-elements mounted to move one relative to another, and normally in spaced relation to each other, and a core-support, the two elements being each adapted to clampingly secure a hose-section with the end-portion thereof projecting into said space to receive a core, and at least one element being adapted to clampingly secure the core-support, the latter having a member projecting into the space to hold a core in alignment with the projecting end-portion of a hose-section in the other element.

GLENN L. McKEE.